(No Model.)

B. H. TRIPP.
SHOCK HAULER.

No. 282,806. Patented Aug. 7, 1883.

WITNESSES:

INVENTOR:
B. H. Tripp
BY
ATTORNEYS.

UNITED STATES PATENT OFFICE.

BRADFORD H. TRIPP, OF GALLATIN, MISSOURI.

SHOCK-HAULER.

SPECIFICATION forming part of Letters Patent No. 282,806, dated August 7, 1883.

Application filed March 29, 1883. (No model.)

*To all whom it may concern:*

Be it known that I, BRADFORD H. TRIPP, of Gallatin, in the county of Daviess and State of Missouri, have invented a new and Improved Shock-Hauler, of which the following is a full, clear, and exact description.

My invention consists of a device which is intended to take up and haul away shocks of grain more readily than they can be handled by the present means, the said device consisting of a pair of knife-blade-shaped runners and a crib or frame to each runner, pivoted at the rear ends of the runners to cross-bars, the runners lying flatwise and with confronting edges, so as to open at the front ends in such manner that, being placed by the sides of the shock and the team started up, the hitching device will first swing the runners together and under the shock and the frame around it, and will then haul it away, the shock being thus taken as it stands and carried away without having to handle the sheaves individually, all as hereinafter fully described.

Reference is to be had to the accompanying drawings, forming a part of this specification, in which similar letters of reference indicate corresponding parts in all the figures.

Figure 1:
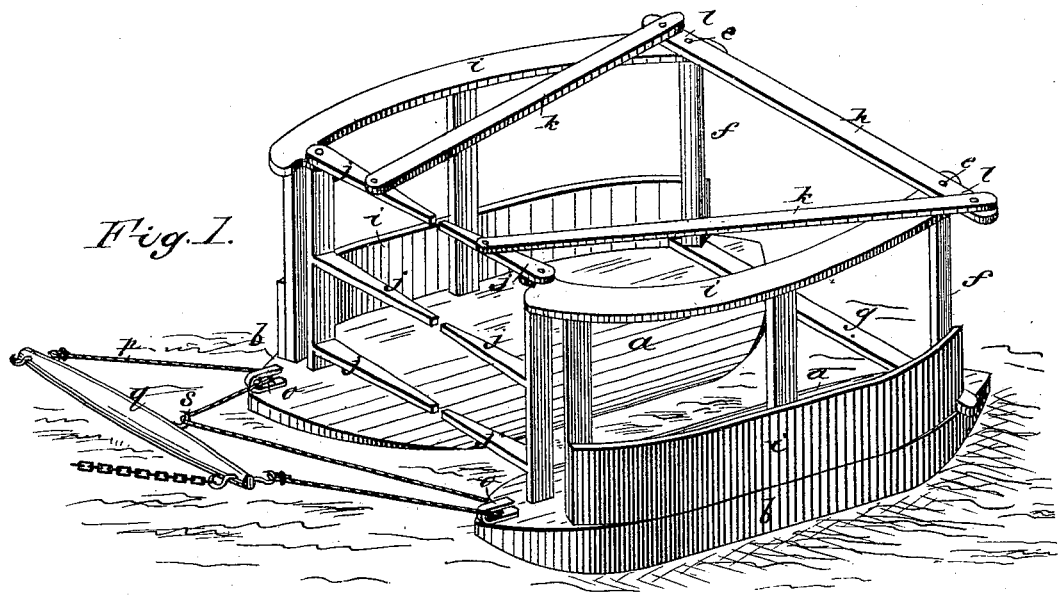
Figure 2:
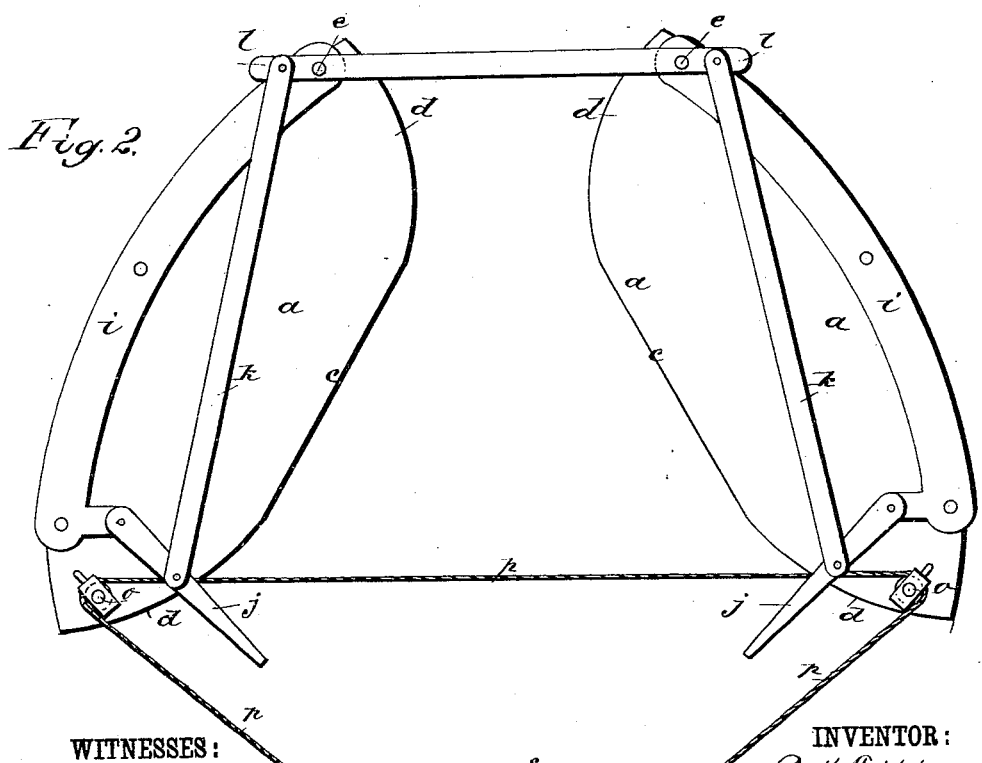

Figure 1 is a perspective view of my improved shock-hauler as it stands after having taken on a shock for hauling it away, the shock not being shown; and Fig. 2 is a plan view of the device as adjusted preparatory to taking on the shock.

I make two broad runners, $a$, of planks, tapered from the back $b$ to the edge $c$ and ends $d$, suitable to facilitate the drawing of said edges under the shocks to take them on the runners and pivot them at $e$ to posts $f$, connected by cross-bars $g$ and $h$, providing said runners with side frames, $i$, to inclose the shocks and hold them on the runners. To the front ends of these runners I apply gates $j$, which are connected by bars with extensions $l$ of top cross-bar, $h$, so that when the front ends of the runners are spread apart, as represented in Fig. 2, the gates will swing open, and when the runners are closed the gates will close, as in Fig. 1. To the front ends of the runners I apply rollers $o$, for connecting the hitching-rope $p$, so that said rope may be readily connected and disconnected; and to the whiffletree $q$, I attach a hook, $s$, for connecting with the rope between rollers $o$, to close up the runners, as in Fig. 1, when the team starts up.

To apply the machine to a shock preparatory to taking it up, the rope $p$ is disconnected from one or both of the rollers $o$, and the machine is swung open at the front end and placed alongside of the shock. The runners being on the respective sides, the rope is then applied to the rollers and the hook $s$ engaged with the rope, as represented in Fig. 1. Then the team is started up and draws the runners under the sides of the shock and closes the gates around it, so as to effectually take up the shock and haul it away bodily, thus greatly simplifying the work and lessening the labor as compared with the common method of taking up the sheaves by hand and loading them on a wagon or carrying them away by hand.

Having thus described my invention, I claim as new and desire to secure by Letters Patent—

1. The knife-edge runners $a$, pivoted to a connecting bar or bars at the rear end, and provided with a hitching device at the front end, whereby said runners are first drawn under the shock and then carry said shock on them, substantially as described.

2. The combination of the runners $a$, cross-bars $g$ $h$, side frames, $i$, gates $j$, and connecting-bars $k$, substantially as described.

3. The combination of the hitching-rope $p$, whiffletree $q$, hook $s$, and roller-connections $o$, with a pair of runners, $a$, connected together and provided with side frames, substantially as described.

BRADFORD H. TRIPP.

Witnesses:
 ROBT. G. YATES,
 L. P. DE HART.